(12) United States Patent
Nakayama et al.

(10) Patent No.: US 6,787,590 B2
(45) Date of Patent: Sep. 7, 2004

(54) COMPOSITES COMPRISING PLANT MATERIAL FROM PARTHENIUM SPP. AND PLASTIC

(75) Inventors: Francis S. Nakayama, Tempe, AZ (US); John A. Youngquist, Verona, WI (US); Poo Chow, Urbana, IL (US)

(73) Assignees: The United States of America as represented by the Secretary of Agriculture, Washington, DC (US); The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/828,634

(22) Filed: Apr. 5, 2001

(65) Prior Publication Data

US 2002/0006987 A1 Jan. 17, 2002

Related U.S. Application Data

(60) Provisional application No. 60/203,813, filed on May 12, 2000.

(51) Int. Cl.$^7$ .................. C08L 89/00; C08L 97/00; C08L 99/00; C08K 5/13
(52) U.S. Cl. ................ 524/9; 524/13; 524/14; 524/15; 524/16; 524/72; 524/74; 524/75; 524/76
(58) Field of Search ............... 524/8, 9, 13, 14, 524/15, 16, 72, 74, 75, 76

(56) References Cited

U.S. PATENT DOCUMENTS

| | | | | |
|---|---|---|---|---|
| 3,927,235 A | * | 12/1975 | Chow | 428/292.4 |
| 4,647,607 A | | 3/1987 | Kay et al. | |
| 4,678,860 A | * | 7/1987 | Kuester | 585/14 |
| 4,988,388 A | * | 1/1991 | Schloman | 106/164.41 |

OTHER PUBLICATIONS

Bultman, J.D., Beal, R.H., Schloman, W.W., and Bailey, C.A., "The Evaluation of Guayule Resin as a Pesticide," *GUAYULE A Natural Rubber Source—Proceedings of the Fourth International Conference on Guayule Research and Development* Oct. 16–19, 1985 (Dec. 1986) pp. 353–356.

Bultman, J.D., Gilbertson, R.L., Adaskaveg, J., Amburgey, T.L., Parikh, S.V., and Bailey, C.A., "The Efficacy of Guayule Resin as a Pesticide," *Bioresource Technology* (1991) pp. 197–201, Elsevier Science Publishers Ltd, Great Britain.

Bultman, J.D. and Schloman Jr., W.W., "The Leachability of Guayule Resin from Treated Wood," *Industrial Crops and Products* (1993) 2(1):33–37, Elsevier Science Publishers B.V.

Bultman, J.D., Chen, S.–L., and Schloman Jr., W.W., "Anti–termitic efficacy of the resin and rubber in fractionator overheads from a guayule extraction process," *Industrial Crops and Products* (1998) 8(2):133–143, Elsevier Science B.V.

Maatooq, G.T., Stumpf, D.K., Hoffmann, J.J, Hutter, L.K., and Timmermann, B.N., "Antifungal Eudesmanoids from *Parthenium Argentatum×P. Tomentosa*," *Phytochemistry* (1996) 41(2):519–524, Elsevier Science Ltd, Great Britain.

Maatooq, G.T. and Hoffmann, J.J., "Fungistatic Sesquiterpenoids From Parthenium," *Phytochemistry* (1996) 42(1):67–69, Elsevier Science Ltd, Great Britain.

Gutierrez, C., Gonzalez–Coloma, A., and Hoffmann, J.J., "Antifeedant Properties of Natural Products from *Parthenium argentatum, P. argentatum×P. tomentosum* (Asteraceae) and *Castela emoryi* (Simaroubeaceae) Against *Reticulitermes flavipes*," *Industrial Crops and Products* (Jun. 1999) 10(1):35–40, Elsevier Science B.V.

\* cited by examiner

Primary Examiner—Nathan M. Nutter
(74) Attorney, Agent, or Firm—Margaret A. Connor; John D. Fado

(57) ABSTRACT

This invention relates to novel composites comprising plastic and plant material derived from members of Parthenium spp. and, in particular, *Parthenium argentatum* (also known as guayule), *Parthenium tomentosum* or *Parthenium incanum*. The invention is also directed to composites that possess insect, fungal, and microbial resistance. Products made from composites of the instant invention are useful to make numerous items, particularly those used for construction such as lumber, plywood, particleboard, fiberboard, poles, railroad crossties, or the like.

19 Claims, No Drawings

COMPOSITES COMPRISING PLANT MATERIAL FROM PARTHENIUM SPP. AND PLASTIC

CROSS-REFERENCE TO RELATED APPLICATIONS

This application claims the benefit of U.S. Provisional Application No. 60/203,813, filed May 12, 2000. The disclosure of said provisional application is incorporated herein by reference in its entirety.

BACKGROUND OF THE INVENTION

This invention relates to novel composites comprising plant material derived from members of the Parthenium spp. and plastic. Products made from composites of the instant invention may be used to make numerous items, particularly those used for construction such as lumber, plywood, poles, railroad crossties, or the like. The new composites comprising Parthenium spp. plant material and plastic are particularly useful to make wood products which exhibit resistance to termite infestation and resistance to fungal decay.

Degradation of wood, whether by insect or microbial activity, is a major problem throughout the world. Accurate economic impact of these organisms on wood damage, repair, and treatment are difficult to assess. Termite treatment in the United States costs the consumer an estimated $2 billion per year (Potter, 1997). Damage, repair, and control of the Formosan termite (*Coptotermes formosanus*) are estimated at $1 billion per year (Suszkiw, 1998). Other types of termites also contribute significantly to the damage of wood containing structures and components. Preventive pressurized and non-pressurized wood treatment costs approximately $5 billion per year (USDA, 1980). Wood damage by fungal rot is also in this order of magnitude (Zabel and Morrell, 1992) and the replacement is estimated to consume 10% of the timber cut annually in the United States, unnecessarily depleting the declining supply of wood. Staining and discoloration of wood by microbial activity are also of economic concern. Besides the problem of physical damage, injury to people and the decrease in real estate value must be considered.

Conventional wood preservatives and insecticides, such as copper chromate arsenate (CCA), creosote, pentachlorophenol, and cyclodiene (chlordane), used to protect wood from insect and microorganism damage, are presently of major concern to human health and the environment. Much effort has been directed to determining alternative materials to control wood damage (Carter and Huffman, 1982; Kamdem, 1994; Evans et al., 1997), but no adequate substitute has been found. Finding alternative preservatives has not been simple. A published study indicates that the natural resinous material extracted from the guayule plant (*Parthenium argentatum* Gray) had anti-termitic and anti-fungal properties (Bultman et al., 1991). This natural resin material is a by-product from the process for extracting rubber from the guayule shrub (Bultman et al., 1998). The application of these findings has not been commercialized. Consequently, an adequate source of this natural resin material has not been available. Similarly, other plants that have termite resistant compounds have been discovered; however, the plants are not readily cultivated for economical commercial production.

The naturally occurring resin material of the guayule plant (*Parthenium argentatum*) has been demonstrated to protect wood against termite, molluscan borer, and fungal attacks (Bultman et al., 1991). The latex rubber from the guayule plant has been shown to be hypoallergenic, unlike Hevea latex, and has great potential for fabricating medical products. Two USDA patents (U.S. Pat. Nos. 5,717,050 and 5,580,942; Cornish et al.) have been obtained for making medical latex products. According to Cornish (personal communication, 1998), approximately 71,000 ha of guayule shrubs must be processed per year to supply 5% of the U.S. latex glove market alone. Because only a small portion of the plant would be actually used for latex production (less than 10%), tremendous amounts of bagasse (the plant residue left after the latex is removed) will be generated. This bagasse contains quantities of the natural resin (10 to 15%) and some residual rubber (Nakayama et al., 1996). When latex processing is fully commercialized, 45 to 110 Mg h$^{-1}$ (20 to 50 tons A$^{-1}$) of waste with natural resin will be produced that must be either disposed or utilized.

The insect-controlling guayule resin is made up of a complex mixture of terpene, sesquiterpene, triterpenoid, phenolic, cinnamic, and fatty acid compounds (Schloman et al., 1983). Some of the active constituent or constituents are beginning to be identified (Gutierrez et al., 1999), but the development of the natural resin extract as a wood preservative still needs to be investigated. The impregnated natural resin extract remains in the wood for a long time (Bultman et al., 1998), an important feature of a wood preservative.

Existing wood composites prepared using traditional wood sources, recycled wood, and recovered wood have been described (see Youngquist et al., 1994; Youngquist et al., 1997, and McKeever et al., 1995).

In recent years, wood supply for making wood composites has become scarce and expensive in the United States because of competition from the paper industry for wood fiber. Thus, producers of wood composites will be forced to seek non-wood plant fibers to supply the increasing raw material requirement in the future.

Weight loss during the mycological testing of particle and fiberboards was reported as a good measure of decay resistance (Chow et al., 1980, 1993, 1994, and 1996). Walters and Chow (1975) reported that phenolic resin bonded boards are preferred in building construction for protection against water and high humidity. However, fungal attack in the phenolic bonded board was as severe as that in the urea bonded board. When composition board becomes wet, it swells mostly in thickness and in length, and considerable bonding degradation occurs.

SUMMARY OF THE INVENTION

The present invention is directed to novel composite compositions comprising plant material from Parthenium spp. and plastic. The Parthenium spp. plant material may comprise whole plants, plant parts, bagasse, or combinations thereof. The Parthenium spp. plant material may further include plant material from plants other than the genus Parthenium and/or added Parthenium spp. natural resin extract.

In making the composites of the invention, the Parthenium spp. plant material is processed, for example by mechanical or chemical reduction, dried, and then combined with the plastic in a manner so as to obtain a product wherein the Parthenium spp. plant material and plastic are bonded together and perform as a single unit.

As discussed above, it has been reported that extracted natural guayule resin has anti-termitic and anti-fungal properties, and could be used to protect wood from damage due to termites and fungi (Bultman et al., 1991). Surprisingly, however, we found that although the biological control factors reside in the natural resin extract, we obtained composites having excellent termite resistance and decay resistance by direct use of Parthenium spp. whole plant, plant parts or bagasse material to make the Parthenium spp.-plastic composites of the invention. That is, termite and fungus-resistant products were obtained while avoiding the need to extract the natural resin from Parthenium spp.

The composites of the invention comprising Parthenium spp. plant material and plastic are useful for making insect- and fungal-resistant wood products. The fabrication of this type of composite that has anti-insect, fungal, and microbial activity has not been seriously considered before. The production of insect- and rot-resistant wood is important to reduce the need to harvest wood and minimize or avoid the cost of replacing termite-damaged wood structures. Thus, the present invention fulfills a long-felt need for composites that possess insect, fungal, and other bio-resistant properties.

Products made from composites of the invention can be used to make numerous items, particularly those used for construction such as lumber, plywood, particleboard, fiberboard, poles, railroad crossties, or the like. Other products of the instant invention include storage bins for crops or other commodities; temporary housing structures; furniture components, including flat and curved surfaces; automobile and truck components; paneling for interior wall sections, partitions, and door systems; floor, wall and roof systems for light-frame construction; wall, roof, and ceiling insulation; packages, containers, cartons, and pallets; filters for air and liquids; and objects made for exterior use such as signs, sign posts, utility poles, fences, substitutes for lumber, plywood, or the like.

Accordingly, it is an object of the invention to provide composites comprising Parthenium spp. plant material and plastic.

Another object of this invention is to provide simple and effective protection from destructive organisms such as termite, fungal, or other types of infestation that can cause wood degradation by using composites comprising plant material derived from the genus Parthenium and plastic. Termite control is effected by fabricating a variety of products made from composites comprising plant material from members of the genus Parthenium and plastic.

A further object of this invention is to use the significant amounts of Parthenium spp. plant residue (bagasse) that will be generated as waste material upon commercialization of guayule for its hypoallergenic rubber latex.

A still further object of this invention is to use recyclable plastics to make the composites of the instant invention.

Still another object of this invention is to reduce the amount of raw wood material that is depleted.

Another object of the invention is to provide termite and fungus-resistant products while avoiding the need to extract the natural resin from Parthenium spp.

The following U.S. patents are incorporated by reference.

U.S. Pat. No. 5,549,869 discloses a method for creating a barrier to protect wood materials by treating wood or the ground surface with a synthetic resin emulsion and an anti-fungal and wood preservative agent and/or a pesticide such as termite-controlling agent.

U.S. Pat. No. 5,612,094 discloses a method of preserving wood products by treating with a zirconium borate-containing preservative composition.

DETAILED DESCRIPTION OF THE INVENTION

Before the composites comprising plant material derived from the genus Parthenium and plastic are disclosed and described, it is to be understood that this invention is not limited to the specific plastics or varieties of Parthenium spp. described below, or to methods of making, as they may vary. It is also to be understood that the terminology used herein is for the purpose of describing particular embodiments, and is not intended to be limiting.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications and patents mentioned herein are incorporated herein by reference in their entirety to disclose and describe the methods and/or materials in connection with which they are cited.

The scope of the present invention is not limited to the uses discussed above or to the specific examples described below.

General Definitions

Parthenium species include *Parthenium argentatum, Parthenium tomentosum,* and *Parthenium incanum.* Other Parthenium species are listed in Hammond, B. L. and Polhamus, L. G. 1965. Research on Guayule (*Parthenium argentatum*): 1942–1959. USDA Tech. Bulletin No. 1327. 157 pp. and Rodriguez, E. 1975.

*Parthenium argentatum,* commonly known as guayule, is the plant from which latex and rubber is extracted.

The term Parthenium spp. plant material refers to material derived from one or more species of plants of the genus Parthenium, including but not limited to whole plants; plant parts, for example, stems, branches, leaves, roots, bark; bagasse; and combinations thereof.

Plant material derived from Parthenium spp. may be combined with plant material from one or more plants of other than the genus Parthenium to make the composites of the invention.

Naturally occurring resin extracted from Parthenium spp. may be combined with plant material from Parthenium spp. to make the composites of the invention.

The Parthenium spp. plant material is processed in any manner known in the art of wood processing, including, for example, by mechanical or chemical reduction. Examples of mechanical reduction include grinding, chopping, milling, chipping, flaking, refining, and the like. Processed Parthenium spp. plant material includes but is not limited to fibers, fiber bundles, particles, flour, chips, flakes, fines, sawdust, pellets, strands, wafers, and combinations thereof An example of chemical reduction is chemical pulping.

Bagasse is the Parthenium spp. plant residue after a component, e.g. latex, is removed.

Fibers are slender, threadlike elements of a plant which are comparatively long, between 40 to 300 mm, narrow, and tapering.

Fiber bundle is a loosely adhered grouping of plant fibers.

Particles, flour, chips, flakes, fines, sawdust, strands, and wafers are distinct fractions of plant material produced mechanically.

Natural plant resins are any of various solid or semisolid, viscous, usually clear or translucent, yellowish or brownish, organic substances naturally produced from various plants and trees; these resins are insoluble in water, but are soluble in polar organic solvents such as ketones, ethers, alcohols, etc. and are used commercially in varnishes and lacquers, and as modifiers in synthetic plastics.

Natural plant resin is found in whole Parthenium spp. plant in the range of about 10 to 15% and in similar concentration in Parthenium spp. bagasse after latex extraction. Because latex extraction is done by a water-based process, little of the plant resin is removed. The percent resin is a w/w measure of oven-dried plant material at about 100±2° C.

Guayule resins are compounds in the guayule plant extractable by polar organic solvents, the more traditional being acetone or methanol. Other solvents, such as xylene can be used, but they will also remove the rubber with the resin fraction.

Latex is a stable emulsion consisting of small rubber particles suspended in a water solution. In the Hevea plant, the latex is contained in ducts, exudes from a wound, and the exudant is collected. In contrast, in the guayule plant, the latex is contained in the plant cells and must be removed by maceration in the presence of organic solvents or water. For obtaining latex from the guayule plant, the plant material must be ground in the presence of a water-based extractant. An emulsion is obtained that is stabilized with an antioxidant and ammonium hydroxide for pH adjustment (greater than 9.0). In contrast, when an organic solvent is used, the rubber is not in the emulsion form and instead is dissolved in the solvent.

Lignocellulosic materials are any of several combinations of lignin, cellulose, and hemicellulose, forming the essential part of woody tissue.

Plastic is a material that contains as an essential ingredient one or more organic polymeric substances of large molecular weight, is solid in its finished state, and, at some stage in its manufacture or processing into finished articles, can be shaped by flow. More specifically, these are materials formed from synthetic resins through the application of heat, pressure, or both. Most starting materials prior to the final fabrication of plastic products exhibit more or less plasticity—hence the term plastic. However, the great majority, but not all, of plastic end products are quite non-plastic, i.e., they are non-flowing, relatively stable dimensionally, and are hard. Plastics that are relevant to this invention fall into two broad categories: 1) thermoplastics which can be heated and softened innumerable times without suffering any basic alteration in characteristics; and 2) thermosetting plastic resins which once set at a temperature critical to a given material cannot be re-softened and re-worked. Examples of thermoplastics that can be used in this invention include acrylonitrile-butadiene-styrene (ABS) resins, acetals, nylons (polyamides), high and low density (HDPE and LDPE, respectively) polyethylenes (including co-polymers), polypropylenes (including co-polymers), polystyrenes, and vinyls. Examples of thermosets that can be used in this invention include alkyds, allylics, the aminos (melamine and urea), epoxies, phenolics, polyesters, silicones, and urethanes.

Composite is a product made up of plant materials and a thermoplastic or a thermoset resin such that the product is bonded together and performs as a single unit. Processes for making composites include melt-blending, air-laying, and compression molding.

Adhesive is a plastic substance capable of holding materials together by surface attachment.

Bond is the union of materials by an adhesive, or to unite materials by means of an adhesive.

Melt-blending is the process of combining a thermoplastic resin and a processed plant material using heat and shear forces to facilitate intimate mixing of the two components. When melt-blending technology is used, it is preferred that the thermoplastic material have a melting point below the decomposition temperature of the plant material.

Air-laying is the process of using high volumes of air to form an intimate and well-mixed layer of thermoplastic fibers and processed plant material that can subsequently be compression molded into a final product using a platen press and heat and pressure. This process can also be used with processed plant material and thermoset resins.

Compression molding is the process of pressing a mixture of either thermoplastics or thermosets and processed plant material into a final product configuration using heat and pressure and a platen press.

Compounding is the feeding and dispersing of the processed plant material component in a molten thermoplastic to produce a homogeneous material.

ASTM (American Standards for Testing Materials) standards establish in great detail how a particular test is to be conducted. ASTM standards are set to insure that test results are comparable from one test location to another test location.

ANSI (American National Standards Institute) standards state that in laboratory tests, specimens show certain minimally acceptable physical and mechanical properties, identified by numerical values. The test values give some indication of product quality. The fiber-plastic composites of the present invention were tested according to these standards against known particle and fiber products. The American National Standards Institute product standards for both particleboard and medium density fiberboard are sponsored by the Composite Panel Association in Gaithersburg, Md.

Parthenium spp.—Plastic Composites

The fabrication of the composites of the invention is accomplished by:

1. Processing the Parthenium spp. plant material to the desired form, for example by mechanical or chemical reduction.
2. Drying the processed Parthenium spp. plant material to a selected moisture content.
3. Combining or blending the processed, dried Parthenium spp. plant material and plastic to achieve substantially uniform mix.
4. Treating the mixture to form a composite, for example, by melt-blending, air-laying or compression molding.

In general, the moisture content of the plant and plastic materials used to fabricate the composites of the invention should be below about 1% when used in the melt-blending process, and below about 20% when used in the air-laid or compression molding processes. Selection of a moisture content of the starting materials is determined by procedures known in the art of composite manufacture.

Parthenium spp.—plastic composites may be made from mixtures of Parthenium spp. plant material and either thermoplastic resins (virgin, recycled, or a combination of both virgin and recycled plastics) or thermoset resins. It is also possible to use materials that do not melt (such as plastic, glass or carbon fibers, for example), but serve as a reinforcing matrix, along with the thermoplastic or thermoset resins.

For thermoplastic resins, the proportions of plastic to processed, dried plant material for this invention may range on a weight/weight basis from 95% plastic:5% plant material to 5% plastic:95% plant material, depending on the technique used. Using melt-blending technology, the proportions of plastic to wood may range from about 95% plastic:5% plant material to 25% plastic:75% plant material. Using air-laid technology, the proportion of plastic to processed, dried plant material may range on a weight/weight basis from 95% plastic:5% plant material to 5% plastic:95% plant material. For thermoset resins generally used in the compression molding process, the proportions of thermoset resin to processed, dried plant material on a weight/weight basis ranges from 15% thermoset resin:85% plant material to 3% thermoset resin:97% plant material.

Other ranges of the proportions of plastic to plant material for thermoplastic resins using melt-blending technology are 80% plastic:20% plant material to 30% plastic:70% plant material. Using air-laid technology, the proportion of plastic to wood may also range from 80% plastic:20% plant material to 20% plastic:80% plant material or from 60% plastic:40% plant material to 40% plastic:60% plant material.

The composites of the invention comprising Parthenium spp. plant material and plastic are useful for making insect- and fungal-resistant wood products. In one embodiment, the composite of the invention exhibits at least about 30% decrease in termite infestation relative to a composite not containing plant material derived from the genus Parthenium or 30% decrease in the number of termites alive after exposure to the composite for one week, preferably at least about 50% decrease in termite infestation or decrease in the number of termites alive, more preferably at least about 71% decrease in termite infestation or decrease in the number of termites alive, even more preferably at least about 80% decrease in termite infestation or decrease in the number of termites alive, even more preferably at least about 93% or 95% decrease in termite infestation or decrease in the number of termites alive, and most preferably 100% decrease in termite infestation or decrease in the number of termites alive.

In another embodiment, the composite of the invention exhibits a rating of resistant or highly resistant to *Gleophyllum trabeum* or *Poria placenta* decay fungi as determined by ASTM standard test D-2017.

Parthenium spp.—Thermoplastic Composites

Broadly defined, a thermoplastic softens when heated and hardens when cooled. Thermoplastics selected for use with the Parthenium spp. plant material should generally melt or soften at or below the degradation point of the plant material component, normally 200° C. to 220° C. (392° F. to 428° F.). These thermoplastics include polypropylene, polystyrene, vinyls, and low- and high-density polyethylenes.

Wood flour is a readily available resource that can be used as a filler in thermoplastic composites. Wood flour is processed commercially, often from post-industrial materials such as planer shavings, chips, and sawdust. Several grades are available depending upon wood species and particle size. Wood fibers, although more difficult to process compared with wood flour, can lead to superior composite properties and act more as a reinforcement than as a filler. In a similar matter, plant material like Parthenium spp. flour or fibers, for example, can be used alone or blended with wood or other plant materials and thermoplastics.

Other materials can be added to affect processing and product performance of Parthenium spp.—thermoplastic composites. These additives can improve bonding between the thermoplastic and plant material component (for example, coupling agents), product performance (impact modifiers, UV stabilizers, flame retardants), and processability (lubricants).

Several considerations must be kept in mind when processing plant material with thermoplastics. Moisture can disrupt many thermoplastic processes, resulting in poor surface quality, voids, and unacceptable parts. Materials must either be pre-dried or vented equipment must be used to remove moisture. The low degradation temperature of the plant material must also be considered. As a general rule, melt temperatures should be kept below 200° C. (392° F.), except for short periods. Higher temperatures can result in the release of volatiles, discoloration, odor, and embrittlement of the wood component.

There are two main strategies for processing thermoplastics in plant material-composites (Youngquist et al., 1994). In the first, the plant material component serves as a reinforcing agent or filler in a continuous thermoplastic matrix. In the second, the thermoplastic serves as a adhesive to the majority plant material component. The presence or absence of a continuous thermoplastic matrix may also determine the processability of the composite material. In general, if the matrix is continuous, conventional thermoplastic processing equipment may be used to process composites; however, if the matrix is not continuous, other processes may be required. For the purpose of discussion, we present two examples for composites with high and low thermoplastic content.

Parthenium spp.—Thermoplastic Composites With High Thermoplastic Content

In composites with high thermoplastic content, the thermoplastic component is in a continuous matrix and the plant material component serves as a reinforcement or filler. In the great majority of reinforced thermoplastic composites available commercially, inorganic materials (for example, glass, clays, and minerals) are used as reinforcements or fillers. Plant materials offer some advantages over inorganic materials; they are lighter, much less abrasive, and renewable. As a re-inforcement, plant materials can stiffen and strengthen the thermoplastic and can improve thermal stability of the product compared with that of unfilled material.

Thermoplastics in pellet form have bulk density in the range of 500 to 600 kg/m$^3$ (31 to 37 lb/ft$^3$). Plant materials typically have an uncompacted bulk density of 25 to 250 kg/m$^3$ (1.6 to 16 lb/ft$^3$). Fibers are at the low end of the plant material bulk density continuum and wood flours at the high end. Although processing of wood flour in thermoplastics is relatively easy, the low bulk density and difficulty of dispersing fibrous materials make plant fiber-thermoplastic blends more difficult to compound. More intensive mixing and the use of special feeding equipment may be necessary to handle longer natural plant fibers.

The manufacture of thermoplastic composites is usually a two-step process. The raw materials are first mixed together, and the composite blend is then formed into a product. The combination of these steps is called in-line processing. In-line processing can be very difficult because of control demands and processing trade-offs. As a result, it is often easier and more economical to separate the processing steps.

Compounding is the feeding and dispersing of the plant material component (e.g. Parthenium spp. plant material) in a molten thermoplastic to produce a homogeneous material. Various additives are added and moisture is removed during compounding. Compounding may be accomplished using either batch mixers (for example, internal and thermokinetic mixers) or continuous mixers (for example, extruders and kneaders). Batch systems allow closer control of residence time, shear, and temperature than do continuous systems. Batch systems are also more appropriate for operations consisting of short runs and frequent change of materials. On the other hand, continuous systems are less operator-dependent than are batch systems and have less batch-to-batch differences (Anon. 1997).

The compounded material can be immediately pressed or shaped into an end product while still in its molten state or pelletized into small, regular pellets for future reheating and forming. The most common types of product-forming methods for fiber-thermoplastic composites involve forcing molten material through a die (sheet or profile extrusion) into a cold mold (injection molding) or pressing in calenders (calendering) or between mold halves (thermoforming and compression molding).

Fiberboard and particleboard-thermoplastic composites can also be made using standard forming techniques (Suchsland, O. and Woodson, G., 1986. Dry-process fiberboard manufacture. Fiberboard manufacturing practices in the United States, USDA Forest Service Agriculture Handbook No. 640, pp. 136–167; USDA Forest Service Agricultural Handbook No. 72, Wood Handbook: Wood as an Engineering Material, prepared by the Forest Product Laboratory, Forest Service USDA, pp.22-1 to 22-13; USDA Forest Service Agricultural Handbook: Wood-based Composites and Panel Products, Wood Handbook: Wood as an Engineering Material, prepared by the Forest Products Laboratory, Forest Service USDA, General Technical Report FPL-GTR-113, pp. 10-1 to 10-31).

Properties of plant fiber-plastic composites can vary greatly depending upon such variables as type, form, and weight fractions of constituents, types of additives, and processing history. Composites with high thermoplastic content are not without tradeoffs. Impact resistance of such composites decreases compared with that of unfilled thermoplastics, and these composites are also more sensitive to moisture than unfilled material or composites filled with inorganic material. From a practical standpoint, however, the thermoplastic component usually makes the temperature sensitivity of the composite more significant than any change in properties brought about by moisture absorption.
Parthenium spp.—Thermoplastic Composites With Low Thermoplastic Content Composites with low thermoplastic content can be made in a variety of ways. In the simplest form, the thermoplastic component acts much the same way as a thermosetting resin; that is, as an adhesive to the plant material component. An alternative is to use the thermoplastic in the form of a textile fiber. The thermoplastic textile fiber enables a variety of plant materials to be incorporated into a low-density, nonwoven, textile-like mat. The mat may be a product in itself, or it may be consolidated into a high-density product.

Experimentally, low-thermoplastic-content composites have been made that are very similar to conventional plant material composites in many performance characteristics (Youngquist et al., 1994). In their simplest form, plant particles or fibers can be dry-blended with thermoplastic granules, flakes, or fibers and pressed into panel products.

Because the thermoplastic component remains molten when hot, different pressing strategies must be used than when thermosetting adhesives are used. Two options have been developed to accommodate these types of composites. In the first, the material is placed in the hot press at ambient temperature. The press then closes and consolidates the material, and heat is transferred through conduction to melt the thermoplastic component, which flows around the plant material component. The press is then cooled, "solidifying" the thermoplastic so that the composite can be removed from the press. Alternatively, the material can be first heated in an oven or hot press. The hot material is then transferred to a cool press where it is quickly consolidated and cooled to make a rigid panel. Some commercial nonstructural plant material-thermoplastic composites are made in this way.
Nonwoven Textile-Type Parthenium spp.—Thermoplastic Composites In contrast to high-thermoplastic-content and conventional low-thermoplastic-content composites, nonwoven textile-type composites typically require long fibrous materials for their manufacture. These fibers might be treated natural materials like jute or kenaf, but more typically they are synthetic thermoplastic materials. Nonwoven processes allow and tolerate a wider range of plant materials and synthetic fibers, depending on product applications. After the fibers are dry-blended, they are air-laid into a continuous, loosely consolidated mat. The mat is then passed through a secondary operation in which the fibers are mechanically entangled or otherwise bonded together. This low-density mat may be a product in itself, or the mat may be shaped and densified in a thermoforming step (Youngquist et al., 1994).

If left at a low density and used without significant modification by post-processing, the mats have a bulk density of 50 to 250 kg/m$^3$ (3 to 16 lb/ft$^3$). These products are particularly well known in the consumer products industry, where nonwoven technology is used to make a variety of absorbent personal care products, wipes, and other disposable items. The products are made from high-quality pulps in conjunction with additives to increase absorptive properties. A much wider variety of plant materials can be used for other applications, as described in the following text.

One interesting application for low-density nonwoven mats is for use as insulation. Low-density mats can also be used for air or paint filters. The density can be varied, depending on the material being filtered and the volume of material that passes through the mat per unit of time.

High-density fiber mats can be defined as composites that are made using the nonwoven mat process and then formed into rigid shapes by heat and pressure. To ensure good bonding, the plant material can be precoated with a thermosetting resin such as phenol-formaldehyde, or it can be blended with synthetic fibers, thermoplastic granules, or any combination of these materials. High-density fiber mats can typically be pressed into products having a specific gravity of 0.60 to 1.40. After thermoforming, the products possess good temperature resistance. Because longer fibers are used, these products exhibit better mechanical properties than those obtained with high-thermoplastic-content composites; however, the high plant material content leads to increased moisture sensitivity.
Parthenium spp.—Thermosetting Plastic Composites Guayule, in whole-plant form, bagasse (after the water-based extraction of latex from the whole plant), and limbs, for example, can be converted into a fiber or particle form that can then be used to fabricate medium density fiberboard (MDF) or particle panels. The plants are reduced to chip form in a hammermill, and then are defibrated, for example, in a Sprout Bauer 305 mm thermal mechanical single disk refiner. Defibration is done in a batch process with each batch limited to a maximum of 4 kg by the capacity of the receiver tank. Before refining, the chips are poured into a digester, ahead of the refiner, to soften them to obtain a higher quality fiber. The chips going into the digester are held for 20 minutes under 586 kPa of steam pressure. Defibration occurs as the chip passes between the rotating and stationary plates of the refiner. A description of how these panels can be fabricated is presented in the following text. The D2B503 type of Sprout-Bauer refiner plates with periphery surface dams enclosed are used for the refining process; the plate gap is 0.36 mm. Refining each batch takes approximately 4 minutes, generaly running between 3 min, 45 sec to 4 min, 10 sec.

The physical characteristics of the fiber can be controlled or modified by varying the chip retention time within the digester, varying the gap between the refiner plates and through the selection of the refiner plate patterns.
Urea Formaldehyde Adhesive The thermosetting adhesive used, for example, can be a water-soluble, liquid urea formaldehyde resin obtained from Neste Resins Corporation, North Bay, Ontario, Canada. The resin, Ba-255, has a solids content of 65 percent, viscosity of 0.19 Cps at 25° C., pH of 7.62, and specific gravity of 1.281.

Drying Parthenium Fibers

When defibration is finished, the resultant fibers have an approximate moisture content of 125 percent. The fibers are dried before further processing. The drying process is done in a steam-heated tray dryer at 94° C. for 24 hours. The fibers are dried to a final moisture content of 3 to 4 percent. The drying process causes the fibers to clump together due to hydrogen bonding and is not suitable for use without further processing.

Opening Parthenium Fibers

The oven-dried fibers are processed through a hammermill using a 19 mm screen opening. The purpose of the hammermilling process is to break-up the clumps and not to shorten fiber length. This procedure results in a high quality fiber with few noticeable fines.

Adhesive Application

The urea-formaldehyde adhesive is mixed together using a high-speed laboratory mixer. The adhesive mixture is sprayed onto the natural plant fiber at 25° C. as it rotates in a drum type blender. All of the blended adhesive coated natural fibers are then hammermilled again. The purpose of the hammermilling process in this case is to break up balls of fiber formed by the resin spraying step. The same 19 mm hammermill screen opening is used with this process.

Panel Manufacture

A. Fiberboard

Mats are hand-formed in a 508 mm by 508 mm deckle box, which is attached to a vacuum. The adhesive coated natural plant fiber is forced through a 6 mm screen on the top of the box. This is done by hand using a brushing motion. This allows individual fibers and fiber bundles to pass through the top screen and collect at the bottom of the box. When all the fiber has been put into the deckle box, the mats are manually pre-compressed. Depending on the target thickness of the board, the average height of the formed mat is 203 mm to 356 mm. In order to reduce the mat height and to increase its density it, the mat is then cold pressed. This procedure reduced the mat height to about 127 mm to 152 mm, which allows for easy insertion into the hot press.

B. Particleboard

Particleboard panel products typically are made from small plant particles and flakes that are bonded together with a synthetic adhesive under heat and pressure. The procedures for forming particle and flake mats are similar to those described above for making fiberboard mats.

Procedure for Pressing Mats into Panels

For both types of boards, all panels are consolidated using a manually controlled, steam-heated press. The press temperature is either 170 or 190° C. Maximum panel pressure during closing is in the range of 3.05 to 6.10 MPa and reduced to 0.11 MPa after reaching the target thickness.

All panels are made with a thermocouple inserted into the center of the formed mat to insure that the core temperature reached optimum levels for proper resin cure. For the 6 mm panels, a press temperature of 190° C. is used to bring the mat core temperature to 110° C. as quickly as possible. When 110° C. is reached, a brief de-gas cycle is used to reduce the steam pressure in the panel. Total press time is 5 minutes.

The press temperature may be reduced to 170° C., and the total pressing time may be reduced from 5 to 4 minutes for the 13 mm panels. The de-gas cycle maybe eliminated by very careful opening of the press at the end of the pressing cycle. Various pressing protocols may be used depending upon the panel thickness being produced.

Mechanical and physical property tests are conducted on specimens cut from the selected experimental panels. For all thicknesses, each panel is weighed, measured and the specific gravity is calculated. Panels, from which the test specimens come, are selected on the basis of which ones are closest to the target specific gravity of 0.77±0.05 and the target thickness. This method of the panel selection allows for narrowing the variability in specific gravity between individual experimental panels.

Prior to mechanical and physical property testing, the specimens are conditioned at 50 percent relative humidity and 20° C. Three-point static bending modulus of rupture (MOR) and modulus of elasticity (MOE), and internal bond strength (IB) tests are performed in conformance with ASTM D1037 Standards (1999a) using an Instron testing machine. Thickness swell and water absorption measurements are made by immersing specimens in water in a horizontal position for 24 hours at ambient temperature. This test is performed in conformance with ASTM D1037. Linear expansion tests are conducted on length measurements made at equilibrium conditions at 50 and 90 percent relative humidity, and at 27° C. The linear expansion test was done in conformance with ASTM D1037.

Testing Parthenium—Plastic Composites for Resistance to Termites, Fungi, and Microorganisms Plant Material Guayule (*Parthenium argentatum*) is only one of the many species comprising the entire genus of Parthenium. The outstanding feature of the *P. argentatum* species, which includes guayule, is that guayule is the only one that synthesizes high molecular weight rubber molecules. The guayule latex is hypoallergenic and has been used to make medical products, i.e., gloves, balloons, catheters, etc. In addition to rubber, guayule also makes resinous materials. The resin has been reported to exhibit anti-termitic and anti-fungal properties (Bultman et al., 1991; Gutierrez et al., 1999). Other Parthenium species also synthesize resin material similar to that of guayule (Rodriguez, E. 1975. The Chemistry and Distribution of Sesquiterpene Lactones and Flavonoids in Parthenium (Compositae): Systematic and Ecological Implications. Unpublished PhD. Thesis. UMI, Ann Arbor, Mich.). Studies to test resins from other species for their biocontrol properties is lacking.

Guayule is the species of choice to work with for the resinous material because the plant has the potential to be cultivated for its latex. Large amounts of waste material will result following the extraction of latex. Only about 3 to 5% (w/w) of the plant is generally used for making latex. The rest must be disposed. Conversely, guayule may be cultivated for its resin with the latex then being considered the by-product.

There are approximately 30 varieties or lines of guayule are in the USDA collection (Hammond, B. L. and Polhamus, L. G. 1965. Research on Guayule (*Parthenium argentatum*)): 1942–1959. USDA Tech. Bulletin No. 1327. 157 pp.). Guayule varieties designated as N565 and 11591 are of particular interest because of their uniformity.

Bultman et al. (1991) used the resin extracted from another variety, the Gila-1 (now designated as AZ-101), in his studies on anti-termitic and -fungal studies. This variety was obtained from the rubber extraction facility operated by Department of Defense (DOD). The AZ-101 variety is a cross or hybrid between *Parthenium tomentosum* and *P. argentatum*, variety 11591. *P. tomentosum* has very little rubber, and mostly resin. The DOD contractor selected the AZ-101 hybrid because of its large biomass and good growth characteristics, even though the rubber content was not as high as other available USDA varieties. In contrast, AZ-101 had higher resin contents than the USDA lines.

EXAMPLE

Methodology

Composites composed of Parthenium spp. plant material and plastic were prepared from whole plant or bagasse and high density polyethylene (HDPE) or phenol formaldehyde (PF) plastic. The experimental composite particleboards were made from ground plant material without any binder. Composite boards were made from the ground plant material using commercial thermal-setting liquid phenol formaldehyde (PF) synthetic adhesive or a high-density polyethylene (HDPE) powder. The ground plant material was mixed thoroughly with the plastic and the composite formed by the melt-blending procedure at approximately 5.04 MPa and 177° C. The PF content of the composite was 6%; the HDPE content was 30%. Three species of Parthenium, (a) argentatum (commonly called guayule), (b) incanum and (c) tomentosum were used.

For purposes of comparison to the composites of the invention, natural guayule resin-treated wood was prepared using Southern yellow pine (Pinus spp.). The guayule resin was obtained by acetone extraction of guayule material. For the resin treatment, wood blocks were placed into a pressure chamber, and the system evacuated until maximum vacuum was attained. The acetone-guayule resin solution was then introduced at various concentrations to fill the chamber. Pressure using nitrogen gas was applied at 700 kPa for 30 min. After the impregnation treatment, the wood was oven-dried at 60° C. to remove the volatile acetone solvent.

Termite resistance tests for the wood materials were run for one week, essentially following ASTM D-3345 (ASTM 1999b) using the eastern subterranean termite Reticulitermes spp. at an exposure of 7 days.

Fungal decay resistant tests for the treated wood blocks were run according to ASTM method D-2017 (ASTM 1999c). The two common brown-rot fungi: Gleophyllum trabeum (ATCC 11539) and Poria placenta (Fr.) Cook (ATCC 11538) were used. The samples were exposed to the fungi for 65 to 80 days. Measurements of the blocks were made after the samples were dried. Duplicates were run for each treatment combination.

Results

The guayule composite board with 30% HDPE controlled 100% of the termites within a seven-day exposure. Only 30% of the termites were alive with the guayule particle board alone, with no plastic adhesive. Parts of the whole plant (branches) were also able to control termites. This was not reported before in the literature.

The composite board made tip of guayule plant material containing 10% natural resin was superior to the wood treated to 97% with the extracted resin (Table 1). Similarly, guayule particle board had similar anti-termitic properties as the wood impregnated to contain 51.8% extracted resin. Thus, fabricating guayule composite would be preferred to making anti-termitic wood instead of by impregnating it with guayule resin.

TABLE 1

Eastern subterranean termite resistance of guayule plant materials and southern pine treated with guayule resin extract.

|  | Observation (after one week) | Rating (ASTM)[a] |
|---|---|---|
| Guayule bagasse and unprocessed whole plant material | | |
| Guayule particleboard (no plastic)[1] | 30% of termites still alive | Low mortality |
| Guayule composite board with 30% HDPE | 0% of termites still alive | High mortality |
| Guayule branches[1] | 0% of termites still alive | High mortality |
| Southern pine wood, guayule resin treated[1], % Percent resin, w/w | | |
| 0% | 100% of termites still alive | No mortality |
| 10.30% | 90% of termites still alive | No mortality |
| 51.8% | 30% of termites still alive | Low mortality |
| 97% | 0% of termites alive | High mortality |

[a]ASTM D-3345 standard
The bagasse used here contained 10% resin material.
[1]Not in accordance with the invention; for comparison purposes only.

The composite wood made from the three species of Parthenium, e.g., argentatum, tomentosom, and incanum all showed anti-termitic properties (Table 2). Other species of Parthenium could show similar anti-termitic properties when made into composites. Composite made from southern pine did not show as much termite control as the Partheniums and the pine wood alone had no resistance to termites. The composites of P. argentatum whole plant and bagasse, where the latex has been removed, both show similar anti-termitic properties. Because bagasse is the waste plant material from the latex extraction process, it would be a preferred economical source rather than using the whole plant.

TABLE 2

Eastern subterranean termite resistance of southern pine wood alone, guayule composite boards made from three Parthenium species (argentatum, tomentosum and incanum), and southern pine wood (Composites were fabricated as described above.).

| Test Material | Observation (after one week) | Rating (ASTM)[a] |
|---|---|---|
| P. argentatum, whole plant composite with 30% HDPE | 5% of termites still alive | High or heavy mortality |
| P. argentatum, bagasse composite with 30% HDPE | 5% of termites still alive | High or heavy mortality |
| P. tomentosum, whole plant composite with 30% HDPE | 6% of termites still alive | High or heavy mortality |

TABLE 2-continued

Eastern subterranean termite resistance of southern pine wood alone, guayule composite boards made from three Parthenium species (*argentatum*, *tomentosum* and *incanum*), and southern pine wood (Composites were fabricated as described above.).

| Test Material | Observation (after one week) | Rating (ASTM)[a] |
|---|---|---|
| *P. incanum*, whole plant composite with 30% HDPE | 7% of termites still alive | High or heavy mortality |
| Southern pine wood composite with 30% HDPE[1] | 40% of termites still alive | Low or moderate mortality |
| Southern pine wood with no HDPE[1] | 100% of termites still alive | No mortality |

[a]ASTM D-3345 standard, (Average of six samples randomly cut from three composite panels, except only one for the bagasse panel).
The resin content in the whole plant for the *P. argentatum*, *P. tomentosum*, and *P. incanum* was 10.94, 9.13, and 2.75% (w/w), respectively.
[1]Not in accordance with the invention; for comparison purposes only.

The anti-fungal property of the guayule composite is demonstrated in Table 3. Similarly to the anti-termitic properties, the composite board showed better anti-fungal resistance than the resin-impregnated wood. In this case, the 30% HDPE-guayule composite had similar resistance as the wood impregnated with 51.8% resin. Thus, it is highly advantageous to fabricate composite boards with anti-fungal resistance than make the resin-impregnated wood as demonstrated by Bultman et al. (1991).

TABLE 3

Decay resistance of guayule composition boards and resin-impregnated wood, and guayule stem.

| | Gleophyllum trabeum | | Poria placenta | |
|---|---|---|---|---|
| | Weight loss (%) | Rating (ASTM)[a] | Weight Loss (%) | Rating (ASTM) |
| Guayule Composites | | | | |
| 6% Phenol formaldehyde guayule composite | 13.9 | Resistant | 19.6 | Resistant |
| Guayule, no plastic[1] | 19.7 | Resistant | 24.0 | Resistant |
| 30% HDPE guayule composite | 6.5 | Highly Resistant | 5.7 | Highly Resistant |
| Guayule Stem (with bark & wood core)[1] | 30.3 | Moderately Resistant | 12.7 | Resistant |
| Southern pine wood guayule resin treated[1], % resin, w/w | | | | |
| 0 | 58.6 | Non-resistant | 47.6 | Non-resistant |
| 2.6 | 52.5 | Non-resistant | 51.0 | Non-resistant |
| 10.3 | 22.4 | Resistant | 45.0 | Non-resistant |
| 51.8 | 8.7 | Highly resistant | 36.6 | Moderately |
| 97.0 | 3.0 | Highly resistant | 11.1 | Resistant |

[a]ASTM D-2017 standard
[1]Not in accordance with the invention; for comparison purposes only.

TABLE A

Differences in the Starting Materials, Proces Used, Products Obtained, and Product Properties of the Invention and the Cited References.

| Subject | Starting Materials | Process Used | Product Obtained | Product Properties |
|---|---|---|---|---|
| Inventon | Parthenium spp. lignocellulosic plant material and plastic | Bonding, e.g., melt-blending, air-laying, and compresion molding | Wood-plastic composite useful to make wood products, particularly for construction such as lumber, plywood, particleboard, fiberboard, etc. | Resistance to termite infestation and resistance to fungal decay |
| Kay et al. U.S. Pat. No. 4,647,607 | Extracted quayule resin and synthetic elastomer | Prepared in an emulsion or hydrocarbon system | Synthetic rubber | Thermooxidatively stabilized |
| Bulman et al. Proceedings, pp. 353–356, 1986) | Extracted, processed full-strength, heated free-flowing guayule resin (*P. argentatum*) and pine sapwood | Impregnation of pine sapwood with heated esin using modified Bethel full-cell, vacuum/pressure technique. | Wood impregnated with extacted resin. The pickup of resin by the wood varied. | The authors state tha the limited field data Indicated potential use as an antitermitic (page 355). |

References

American Society for Testing and Materials (ASTM). 1999a. Standard Test Method for Properties of Wood-based Fiber and Particle Pane Material. ASTM D 1037-96. Book of ASTM Standard.Sect. 4, Vol. 04.10-Wood. ASTM. West Conshohocken, Pa.

American Society for Testing and Materials (ASTM). 1999b. Standard Test Method for Laboratory Evaluation of Wood and Other Cellulosic Materials for Resistance to Termite. D-3345-74 (Re-approved 1992). Book of ASTM Standard. Sect. 4, Vol. 04.10-Wood. ASTM. West Conshohocken, Pa.

American Society of Testing and Materials (ASTM). 1999c. Standard Test Method for Accelerated Laboratory Test of Natural Decay Resistance of Woods. D-2017-81. ASTM. West Conshohocken, Pa.

Bultman, J. D., Gilbertson, R. K., Adaskaveg, J., Amburgey, T. L., Parikh, S. V., and Bailey, C. A. (1991). The efficacy of guayule resin as a pesticide. Bioresource Technol. 35. 1997-201.

Bultman, J. D., Chen, S-L, and Schloman, W. W., Jr. 1998. Anti-termitic efficacy of the resin and rubber in fractionator overheads from a guayule extraction process. Ind. Crops Prod. 8. 133–143.

Carter, F. L. and Huffman, J. B. 1982. Termite responses to wood and extracts of Melaleuca. Wood Science 14 (3):237–133.

Chow, P., and Gerdemann, J. W. 1980. Effects of cold-dip treatment on natural durability of wood-base building materials against decay and dimensional change. American Society for Testing and Materials Special Technical Publication 691 pp. 959–971. Philadelphia, Pa. 19103. U.S.A.

Chow, P., Harp, T. L., Youngquist, J. A., and Rowell, R. M. 1993. Durability of Dry-Process Hardboard Against Decay. In: Book of Durability of Building Materials and Component (6). Vol. 1. pp. 23–29. EN & FN Spon, London.

Chow, P., Harp, T. L., Meimban, R., Youngquist, J. A., and Rowell, R. M. 1994. Biodegradation of Acetylated Southern Pine and Aspen Composition Board. The IRG/WP 94-40020, Stockholm, Sweden.

Chow, P., Harp, T., Youngquist, J. A., and Rowell, R. M. 1996. Effects of acetylation on the dimensional stability and decay resistance of kenaf fiberboard. The IRG/WO/96-40059, Stockholm, Sweden.

Evans, P.D., Creffield, J. W., Conroy, G., and Barry, S. C. 1997. Termite and decay resistance of particleboard composed of white cypress pine and Radiata pine. The International Research Group on wood Preservatives. Doc. No. IRGWP/97-10200. IRG, Stockholm, Sweden. 7 pp.

Gutierrez, C., Gonzalez-Coloma, A., and Hoffmann, J. J. 1999. Antifeedant properties of natural products from *Parthenium argentatum, P. argentatum x P. tomentosum* (Asteraceae) and *Castel emoryi* (Simaroubeaceae) against *Reticulitermes flavipes*. Ind. Crops Prod. Vol. 10. pp. 35–40.

Hammond, B. L. and Polhamus, L. G. 1965. Research on Guayule (*Parthenium argentatum*)): 1942–1959. USDA Tech. Bulletin No. 1327. 157 pp.

Kamdem, D. P. 1994. Fungal decay resistance of aspen blocks treated with heartwood extracts. Forest Products J. 44 (1):30–32.

McKeever, D. B., Youngquist, J. A., and English, B. W. (1995). Sources and availability of recovered wood and fiber for composite products. Proceedings of the 29th international particleboard/composite materials symposium. Apr. 4–6, 1995, Pullman, Wash.

Modem particleboard and dry-process fiberboard manufacturing. Maloney, T. M. 1993 San Francisco, Calif.: Miller Freeman Publications. 681 p.

Nakayama, F. S., Kroeger, K. D., Hoffman, J. J., Stumpf, D. K., and Vinyard, S. H. 1996. Guayule latex preparation. Abstr. Assoc. Advance. Ind. Crops. San Antonio, Tex. p. 35.

Potter, D. 1997. Termites. In Mallis, A (Ed.). Handbook of Pest Control. Eight Edition. pp. 233–333.

Rodriguez, E. 1975. The Chemistry and Distribution of Sesquiterpene Lactones and Flavonoids in Parthenium (Compositae): Systematic and Ecological Implications. Unpublished PhD. Thesis. UMI, Ann Arbor, Mich.

Rowell, R. M., Youngquist, J. A., and Imamura, Y. 1988. Strength tests on acetylated aspen flake boards exposed to a brown-rot fungus. Wood and Fiber Science Vol. 20 (2). pp. 266–271.

Schloman, W. W., Jr., Hively, R. A., Krishen, A., and Andrews, A. M. 1983. Guayule byproduct evaluation: Extract characterization. J. Agric. Food Chem. 31:873-876.

Suchsland, O. and Woodson, G., Dry-process fiberboard manufacture. 1986. Fiberboard manufacturing practices in the United States, USDA Forest Service Agriculture Handbook No. 640, pp. 136–167

Suszkiw, J. 1998. The Formosan termite: A formidable foe. Agricultural Research 46 (10):4–9.

USDA. 1980. Biologic and Economic Assessment of Pentachlorophenol, Inorganic Arsenicals, Creosote. Vol. 1: Wood Preservatives. USDA Tech. Bull. 1658-1.

USDA Forest Service Agricultural Handbook No. 72, Wood Handbook: Wood as an Engineering Material, prepared by the Forest Product Laboratory, Forest Service USDA, pp.22-1 to 22-13.

USDA Forest Service Agricultural Handbook: Wood-based Composites and Panel Products, Wood Handbook: Wood as an Engineering Material, prepared by the Forest Products Laboratory, Forest Service USDA, General Technical Report FPL-GTR-113, pp. 10-1 to 10-31).

Walters, C. S. and Chow, P. 1975. A soil-block assay of treated and untreated particleboard. American Wood Preservers Association. Vol. 71. pp. 170–175.

Wood handbook-Wood as an engineering material. USDA Forest Service, Forest Products Laboratory. General Technical Report FPL-GTR-113. Madison, Wis. USA. 463 p.

Youngquist, J. A., Krzysik, A. M., Chow, P., and Meimban, R. 1997. Properties of composite panels. Paper and Composites from Agro-Based Resources, eds. Rowell, R. M., Young, R. A, and Rowell, J. K. CRC Lewis Publishers, Boca Raton.

Youngquist, J. A.; Myers, G. E.; Muehl, J. M, Krzysik, A. M., and Clemons, C. M. 1994. Composites from recycled wood and plastics. Final Report, U.S. Environmental Protection Agency, Project IAG DW12934608-2. Madison, Wis.: U.S. Department of Agriculture, Forest Service, Forest Products Laboratory.

Zabel, R. A. and Morrell, J. J. 1992. Wood Microbiology—Decay and Its Prevention. Academic Press, Inc. San Diego, Calif.

The references cited above and throughout the specification are incorporated by reference in their entirety.

What is claimed is:

1. A composite comprising Parthenium species lignocellulosic plant material having naturally occurring resin and synthetic oraganic polymer plastic, wherein the ratio of plastic to plant material ranges by weight from 80% plastic:20% plant material to 20% plastic:80% plant material.

2. The composite of claim 1, wherein the Parthenium species comprises *Parthenium argentatum, Parthenium tomentosum* or *Parthenium incanum*.

3. The composite of claim 1, wherein the Parthenium species plant material comprises (a) whole plant material, (b) plant part material, (c) bagasse, or (d) a combination of (a)–(c).

4. The composite of claim 1, wherein the Parthenium species plant material is processed.

5. The composite of claim 4, wherein the plant material is processed by a mechanical or chemical reduction process.

6. The composite of claim 4 wherein the processed Parthenium species plant material comprises fibers, fiber bundles, particles, flour, chips, flakes, fines, sawdust, pellets, strands, wafers or combinations thereof.

7. The composite of claim 1, wherein the plastic is thermoplastic.

8. The composite of claim 7, wherein the thermoplastic is a synthetic organic polymer comprising acrylonitrile-butadiene-styrene; polymer containing acetal groups; nylon, including polyamide; high and low density polyethylene, including co-polymers; polypropylene, including co-polymers; polystyrene; or polymer containing vinyl groups.

9. The composite of claim 7, wherein the ratio of thermoplastic to plant material ranges by weight from 80% thermoplastic:20% plant material to 30% thermoplastic:70% plant material.

10. The composite of claim 1, wherein the plastic is thermoset.

11. The composite of claim 10, wherein the thermoset is a synthetic organic polymer comprising alkyd; polymer containing allylic groups; polymer containing amino groups, such melamine and urea polymers; epoxy; phenolic; polyester; silicone; or urethane.

12. The composite of claim 10, wherein the ratio of thermoset to plant material ranges by weight from 80% thermoset:20% plant material to 30% thermoset:70% plant material.

13. The composite of claim 1, wherein the plastic is virgin, recycled, or a combination of both virgin and recycled plastic.

14. The composite of claim 1, wherein the composite is made by the air-laying, melt-blending or compression molding method.

15. The composite of claim 1, wherein the composite is particle board or fiberboard.

16. The composite of claim 1, wherein the Parthenium species plant material further comprises (a) lignocellulosic plant material from a plant other than the genus Parthenium, (b) added Parthenium species natural resin extract or (c) combinations of (a) and (b).

17. The composite of claim 1 comprising Parthenium species lignocellulosic plant material having naturally occurring resin and synthetic organic polymer plastic, wherein the composite exhibits at least a 30% decrease in termite infestation relative to a composite not containing plant material derived from the genus Parthenium as determined by ASTM standard test D-3345.

18. The composite of claim 1 comprising Parthenium species lignocellulosic plant material having naturally occurring resin and synthetic organic polymer plastic, wherein the composite exhibits a rating of resistant or highly resistant to *Gleophyllum trabeum* or *Poria placenta* decay fungi as determined by ASTM standard test D-2017.

19. The composite of claim 17, wherein the composite further exhibits a termite resistance rating of high or heavy termite mortality as determined by ASTM standard test D-3345.

\* \* \* \* \*